United States Patent
Ogawa et al.

(10) Patent No.: US 11,093,224 B2
(45) Date of Patent: Aug. 17, 2021

(54) COMPILATION TO REDUCE NUMBER OF INSTRUCTIONS FOR DEEP LEARNING PROCESSOR

(71) Applicant: INTERNATIONAL BUSINESS MACHINES CORPORATION, Armonk, NY (US)

(72) Inventors: Eri Ogawa, Saitama-ken (JP); Kazuaki Ishizaki, Tokyo (JP); Hiroshi Inoue, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 205 days.

(21) Appl. No.: 16/393,333

(22) Filed: Apr. 24, 2019

(65) Prior Publication Data
US 2020/0341765 A1    Oct. 29, 2020

(51) Int. Cl.
*G06F 9/45* (2006.01)
*G06F 8/41* (2018.01)
*G06F 9/30* (2018.01)

(52) U.S. Cl.
CPC .............. *G06F 8/41* (2013.01); *G06F 8/443* (2013.01); *G06F 8/447* (2013.01); *G06F 8/452* (2013.01);
(Continued)

(58) Field of Classification Search
CPC . G06F 8/41; G06F 8/443; G06F 8/447; G06F 8/452
(Continued)

(56) References Cited

U.S. PATENT DOCUMENTS 5,797,013 A * 8/1998 Mahadevan ............ G06F 8/443
                                                    712/241
6,003,128 A * 12/1999 Tran ...................... G06F 9/3844
                                                    712/23

(Continued)

OTHER PUBLICATIONS

Avoiding conditional branches by code replication author: F Mueller et al, published on 1995.*

(Continued)

*Primary Examiner* — Chameli Das
(74) *Attorney, Agent, or Firm* — Tutunjian & Bitetto, P.C.; Randall Bluestone

(57) ABSTRACT

A method performed during execution of a compilation process for a program having nested loops is provided. The method replaces multiple conditional branch instructions for a processor which uses a conditional branch instruction limited to only comparing a value of a general register with a value of a special register that holds a loop counter value. The method generates, in replacement of the multiple conditional branch instructions, the conditional branch instruction limited to only comparing the value of the general register with the value of the special register that holds the loop counter value for the inner-most loop. The method adds (i) a register initialization outside the nested loops and (ii) a register value adjustment to the inner-most loop. The method defines the value for the general register for the register initialization and conditions for the generated conditional branch instruction, responsive to requirements of the multiple conditional branch instructions.

20 Claims, 18 Drawing Sheets

(52) U.S. Cl.
CPC ...... *G06F 9/30058* (2013.01); *G06F 9/30065* (2013.01)

(58) Field of Classification Search
USPC .......................................... 717/140, 141, 150
See application file for complete search history.

(56) References Cited

U.S. PATENT DOCUMENTS

| | | | | |
|---|---|---|---|---|
| 6,885,946 | B1* | 4/2005 | Drummond | G06F 15/8007 702/16 |
| 8,499,293 | B1* | 7/2013 | Ashcraft | G06F 8/441 717/151 |
| 10,146,516 | B2* | 12/2018 | Ebcioglu | G06F 15/17381 |
| 2008/0235657 | A1* | 9/2008 | Kim | G06F 8/4441 717/106 |
| 2016/0162267 | A1 | 6/2016 | Kawahito | |
| 2017/0123798 | A1* | 5/2017 | Friedmann | G06F 9/30072 |
| 2017/0242696 | A1 | 8/2017 | Kidd et al. | |
| 2019/0018815 | A1 | 1/2019 | Fleming et al. | |
| 2020/0241879 | A1* | 7/2020 | Vorbach | G06F 9/3867 |

OTHER PUBLICATIONS

Enhanced modulo scheduling for loops with conditional branches, author: NJ Warter et al, published on 1992.*
Optimized unrolling of nested loops author: V Sarkar published on 2000; source ACM.*
A compilation method for zero overhead loop in DSPs with VLIW, author: R Chang et al, published on 2017; source: IEEE.*
Mowry et al., "Automatic Compiler-Inserted I/O Prefetching for Out-of-Core Applications", Proceedings of the Second Symposium on Operating Systems Design and Implementation (OSDI '96), Oct. 1996, pp. 1-15.
Muthukumar et al., "Software Pipelining of Nested Loops", LNCS 2027, Mar. 2001, pp. 165-181.
Rotem et al., Glow: Graph Lowering Compiler Techniques for Neural Networks, arXiv:1805.00907v2 [cs_PL] May 4, 2018, pp. 1-10.

* cited by examiner

```
for (int i1=0; i1<=max1; i1++) {
    for (int i2...) {
        ...
        for (int in=0; in<=maxn; in++) {
            if (i1(cond)imm (and/or) ... in(cond)imm) {
                -Body-
                ...
            }
            ...
        }
    }
}
```

```
Reg0 = 12 ((max true_values(5) + 1) * 2)
Reg1 = -5 ((true_values(7) - L5(2)) * -1)
Reg2 = 18 (min true_values(9) * 2)
Reg3 = 46 ((max true_values(22) + 1) * 2)
LOOP L1
 LOOP L2
  LOOP L3
   LOOP L4
    LOOP L5
     JCMP Reg0 > L5 Body:
     JCMP Reg1 == L5 Body:
     JCMP Reg2 > L5 skip:
     JCMP Reg3 < L5 skip:
     -Body-
    skip:
     Reg0 = Reg0 - 2
     Reg1 = Reg1 + 1
     Reg2 = Reg2 - 2
     Reg3 = Reg3 - 2
```

FIG. 14

```
for (int i1=0; i1<=max1; i1++) {
  for (int i2...) {
    ...
      for (int i5=0; i5<=max5; i5++) {
        if (i1!=max1||i2!=max2||i3!=max3||i4!=max4||i5!=max5) {
          -Body-
        }
      }
    ...
  }
}
```

FIG. 16

COMPILATION TO REDUCE NUMBER OF INSTRUCTIONS FOR DEEP LEARNING PROCESSOR

BACKGROUND

The present invention generally relates to machine learning, and more particularly to a compilation to reduce a number of instructions for a deep learning processor.

Driven by recent advancements in deep learning, Artificial Intelligence (AI) accelerators are now critically important to hardware systems. Such AI accelerators often provide high processing power by increasing parallelism in trade for functionalities such as, for example, instruction buffer size. However, considering power performance, a trade-off between processing power and functionalities is important for AI accelerators.

These acceleration processors also should be easily programmable by a software developer although they often have a simple and particular instruction set. When a compiler generates a native code for such a processor, some functions such as convolution functions for image recognition often require a long instruction sequence to do a conditional branch based on complicated conditions. Such a scenario requires a large number of instructions, which cannot fit into the instruction buffer, and may also require long instructions which typically decrease processing performance.

In particular, a problem exists in relation to a processor which has a conditional branch instruction that compares a value of a special register that holds a current loop count value with a constant value or a value of a general register. That is, this conditional branch instruction cannot compare an immediate value (current loop count value) with a register. When a compiler generates a native code for such a processor, some functions such as convolution functions for image recognition often require many conditional branch instructions to handle special cases such as a zero-padding. Such a scenario requires large instruction buffers and long instruction sequences which decrease processing performance.

Accordingly, there is a need for a compilation method to reduce the number of instructions for a deep learning processor.

SUMMARY

According to an aspect of the present invention, a computer-implemented method performed during an execution of a compilation process for an iterative program having multiple nested loops is provided. The method is for automatically replacing a plurality of conditional branch instructions in the iterative program for a processor which uses a conditional branch instruction that is limited to only comparing a value of a general register with a value of a special register that holds a loop counter value. The method includes generating, in replacement of the plurality of conditional branch instructions, the conditional branch instruction that is limited to only comparing the value of the general register with the value of the special register that holds the loop counter value for the inner-most loop. The method further includes adding, by the processor-based compiler, (i) a register initialization outside of the multiple nested loops and (ii) a register value adjustment to the inner-most loop. The method also includes defining, by the processor-based compiler, the value for the general register for the register initialization and conditions for the generated conditional branch instruction, responsive to one or more requirements of the plurality of conditional branch instructions.

According to another aspect of the present invention, a computer program product is provided for a method performed during an execution of a compilation process for an iterative program having multiple nested loops. The method is for automatically replacing a plurality of conditional branch instructions in the iterative program for a processor which uses a conditional branch instruction that is limited to only comparing a value of a general register with a value of a special register that holds a loop counter value. The computer program product includes a non-transitory computer readable storage medium having program instructions embodied therewith. The program instructions are executable by a computer to cause the computer to perform a method. The method includes generating, by a processor-based compiler in replacement of the plurality of conditional branch instructions, the conditional branch instruction that is limited to only comparing the value of the general register with the value of the special register that holds the loop counter value for the inner-most loop. The method further includes adding, by the processor-based compiler, (i) a register initialization outside of the multiple nested loops and (ii) a register value adjustment to the inner-most loop. The method also includes defining, by the processor-based compiler, the value for the general register for the register initialization and conditions for the generated conditional branch instruction, responsive to one or more requirements of the plurality of conditional branch instructions.

According to yet another aspect of the present invention, a computer processing system is provided for performing a method during an execution of a compilation process for an iterative program having multiple nested loops. The method is for automatically replacing a plurality of conditional branch instructions in the iterative program for a processor which uses a conditional branch instruction that is limited to only comparing a value of a general register with a value of a special register that holds a loop counter value. The system includes a memory for storing program code. The system further includes a processor-based compiler for running the program code to generate, in replacement of the plurality of conditional branch instructions, the conditional branch instruction that is limited to only comparing the value of the general register with the value of the special register that holds the loop counter value for the inner-most loop. The processor further runs the program code to add (i) a register initialization outside of the multiple nested loops and (ii) a register value adjustment to the inner-most loop. The processor also runs the program code to define the value for the general register for the register initialization and conditions for the generated conditional branch instruction, responsive to one or more requirements of the plurality of conditional branch instructions.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 9 is a diagram showing an exemplary input program to which the present invention can be applied, in accordance with an embodiment of the present invention;

FIG. 14 is a diagram showing generated code for the use case of FIG. 13, in accordance with an embodiment of the present invention;

FIG. 16 is a diagram showing an exemplary input program to which the present invention can be applied, in accordance with an embodiment of the present invention;

DETAILED DESCRIPTION

The present invention is directed to a compilation to reduce a number of instructions for a deep learning processor.

Embodiments of the present invention can reduce both the number of execution cycles and the number of instructions.

In an embodiment, a compilation method is provided to automatically replace many conditional branch instructions with a smaller number of instructions for a processor which can use a conditional branch instruction that can only compare a constant value or a value of a general register with a value of a special register that holds loop counter value of a loop.

In an embodiment, a compiler generates a code by using a register as a counter instead of generating many number of conditional branch instructions.

To that end, the present invention will be described with respect to a first use case (case 1) and a second use case (case 2).

Case 1 (e.g., loopCounter==0): If the conditional branch is taken only once at a particular iteration during the execution (e.g., loopCounter==0), a compiler adds a register initialization instruction outside of the loops and an increment instruction for the register to the innermost loop of the loops. Then, the compiler replaces the conditional branch instructions with one conditional branch which compares the register value and the innermost loop counter value.

Case 2 (e.g., loopCounter<10): If the conditional branch is taken multiple times at a range of continuous iterations (e.g., loopCounter<10) (case 2), a compiler adds a register initialization instruction outside of the loops and an decrement instruction by 2 for the register to the innermost loop of the loops. Then a compiler replace the conditional branch instructions with one conditional branch which compares the register value and the innermost loop counter value. (p6: proposed method case 2).

The generated code by case 1 and case 2 can coexist in the same loop.

When the conditions of the target conditional branch instructions indicate some iterations of the loops which are not continuous, a compiler can replace the target conditional branch instructions by using case 1 and case 2 method recursively.

A processor needs to only have the following instructions for a register by using this method: (a) an assignment operation of a constant value for a register; (b) addition and subtraction operations of a constant value for a register; and (c) a conditional branch instruction which compares the loop counter value of the innermost loop, which the conditional branch instruction is in the body of, with a value of a general register. It is presumed that the processor cannot run a conditional branch instruction which compares a value of general register and a constant value.

A variation for a loop index should be 1 for this method.

Figure 1:
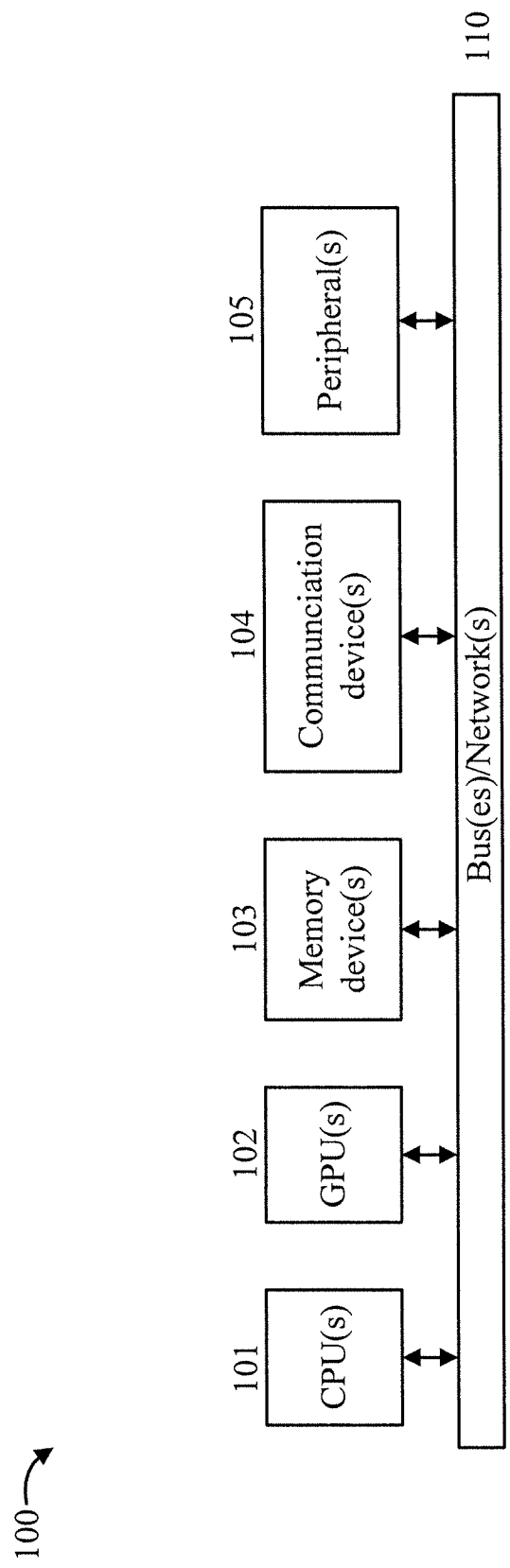
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processing system into a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Instead of generating multiple conditional branches in the inner-most loop of nested loops in order to detect a loop counter value of each loop, the proposed method generates one conditional branch instruction, which compares a value of a special register which holds a loop counter value with a general register value in the inner-most loop, by adding a register initialization outside of the loops and a register increment/decrement instruction in the inner-most loop.

A processor needs to have only the following instructions for a register by using this method: (a) an assignment operation of a constant value for a register, (b) addition and subtraction operations of a constant value for a register, (c) a conditional branch instruction which compares the loop counter value of the inner-most loop, which the conditional branch instruction is in the body of, with a value of a general register. It is presumed that the processor cannot run a conditional branch instruction which compares a general register value and a constant value.

A constant value for the register initialization and conditions for the generated conditional branch are defined based on the requirement of the original conditional branches.

If the conditional branch is taken only once at a particular iteration during the execution (e.g., loopCounter==0) (case 1), then a compiler adds a register initialization instruction outside of the loops and an increment instruction for the register to the innermost loop of the loops. Then, the compiler replaces the conditional branch instructions with one conditional branch which compares a general register value and a value of a special register which holds the inner-most loop counter value.

If the conditional branch is taken multiple times at a range of continuous iterations (e.g. loopCounter<10) (case 2), then a compiler adds a register initialization instruction outside of the loops and a decrement instruction by 2 for the register to the inner-most loop of the loops. Then, the compiler replaces the conditional branch instructions with one conditional branch which compares the general register value and a value of a special register which holds the inner-most loop counter value.

When the number of target loops are few, the proposed method might increase the number of code size compared with the original code. In this case, the compiler can perform a fallback to the original code.

It is presumed that the loop counter value for the loop which is run N-times will be decremented from N to 1 for the following examples.

A description will now be given regarding a proposed method for case 1, in accordance with an embodiment of the present invention.

Figure 2:
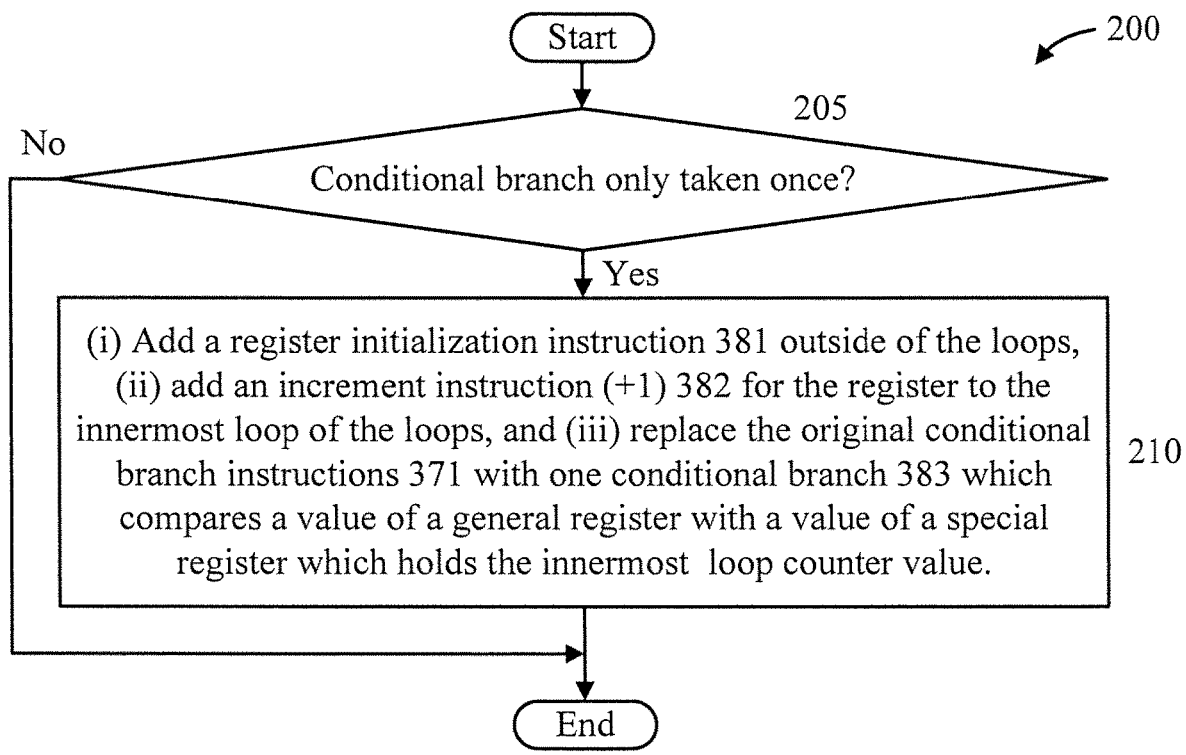
FIG. 2 is a flow diagram showing an exemplary method for generating device code from software code for a case 1 scenario, in accordance with an embodiment of the present invention.

FIG. 2 is a flow diagram showing an exemplary method 200 for generating device code 320 from software code 310 for a case 1 scenario, in accordance with an embodiment of the present invention.

Figure 3:
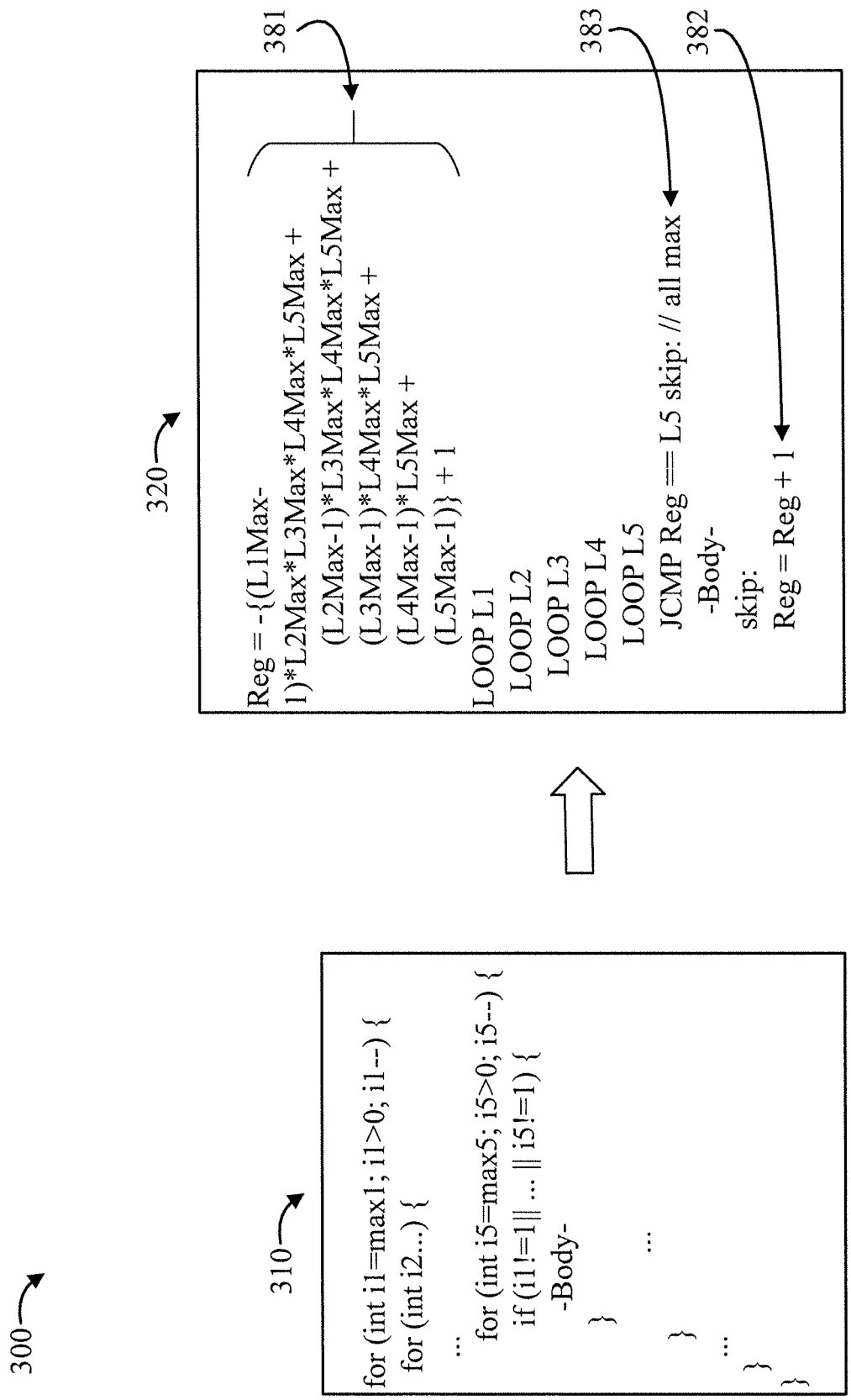
FIG. 3 is a diagram showing the software code and the device code corresponding to the case 1 scenario of FIG. 2, in accordance with an embodiment of the present invention.

FIG. 3 is a diagram showing the software code 310 and the device code 320 corresponding to the case 1 scenario of FIG. 2, in accordance with an embodiment of the present invention.

At block 205, determine if a conditional branch in the software code 310 is taken only once (e.g., loopCounter==0) at a particular iteration during an execution of the software code 310. If so, then proceed to block 210. Otherwise, terminate the method.

At block 210, (i) add a register initialization instruction 381 outside of the loops, (ii) add an increment instruction (+1) 382 for the register to the innermost loop of the loops, and (iii) replace the original conditional branch instructions 371 with one conditional branch 383 which compares a value of a general register with a value of a special register which holds the innermost loop counter value. Blocks 210 and 220 are performed by a software compiler.

Figure 4:
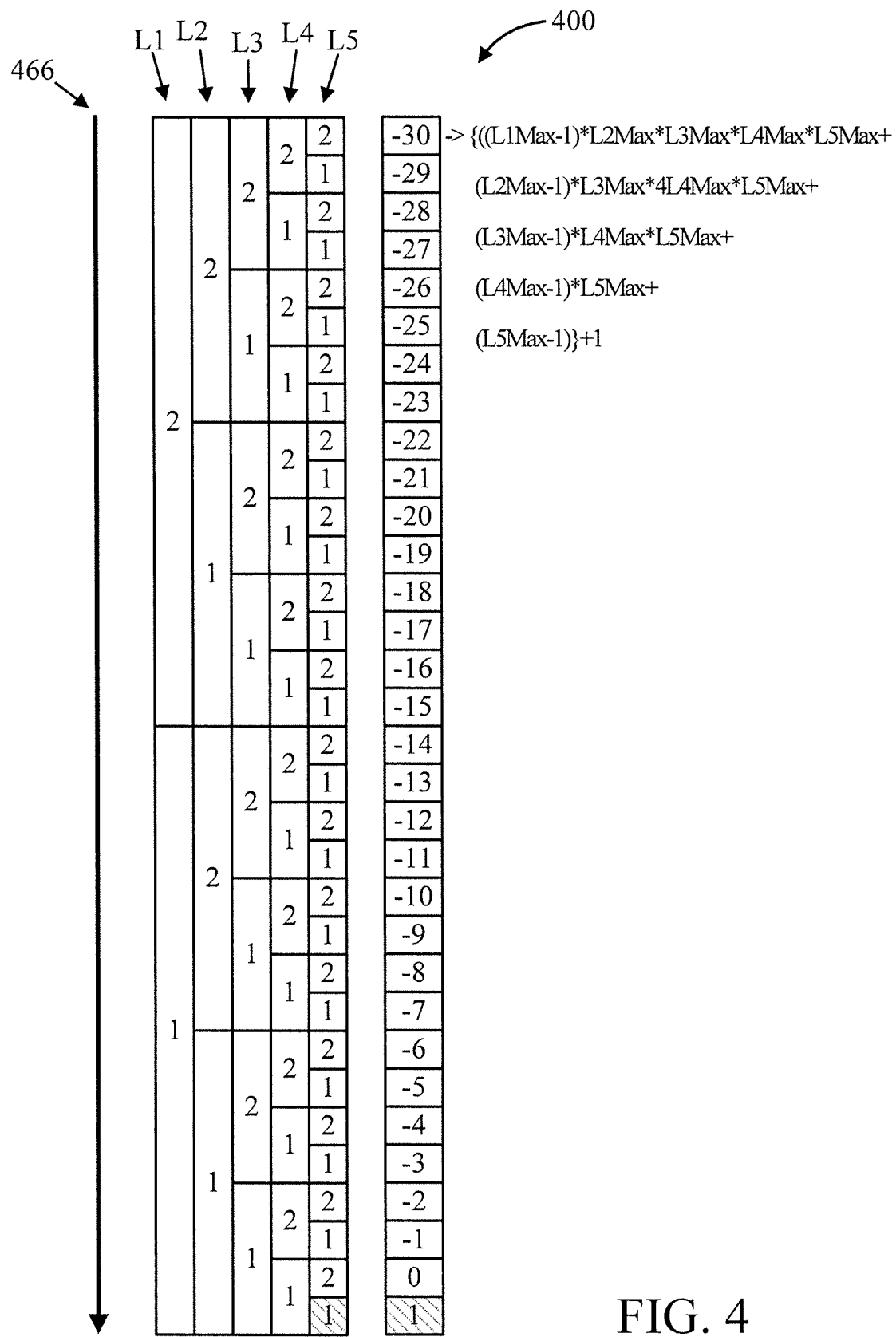
FIG. 4 is a block diagram showing an exemplary mapping of loop counter register numbers to loop counter values to register values, in accordance with an embodiment of the present invention.

FIG. 4 is a block diagram showing an exemplary mapping 400 of loop counter register numbers (L1 through L5) to loop counter values (N to 1, where N=2) to (general) register values (−30 through 1, in increments of 1), in accordance with an embodiment of the present invention.

The mapping 400 involves 32 registers (storing 1 to 30 inclusive of 0), 5 loops (L1 through L5), and 2 loop counter values (1 and 2). The arrow 466 denotes the flow direction for loop iterations.

In the mapping 400, L1max=L2max=L3max=L4max=L5 max=2. Hence, the loop counter value for the loop which is run N times will be decremented from N to 1. The loop iterations that have cross-hatching in loop L5 include conditions which should be detected.

Regarding, for example, register holding −30:
−30→{((L1Max−1)*L2Max*L3Max*L4Max*L5Max+
(L2Max−1)*L3Max*4L4Max*L5Max+
(L3Max−1)*L4Max*L5Max+
(L4Max−1)*L5Max+
(L5Max−1)}+1

A description will now be given regarding a proposed method for case 2, in accordance with an embodiment of the present invention.

Figure 5:
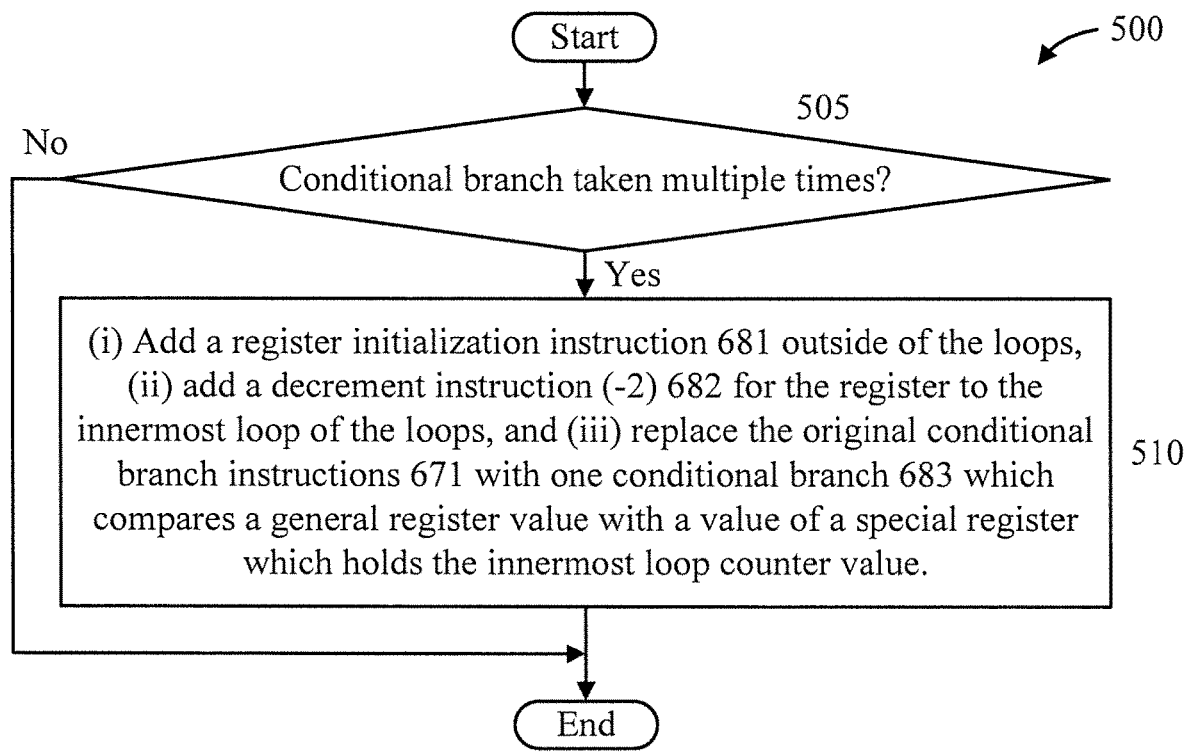
FIG. 5 is a flow diagram showing an exemplary method for generating device code from software code for a case 2 scenario, in accordance with an embodiment of the present invention.

FIG. 5 is a flow diagram showing an exemplary method 500 for generating device code 620 from software code 610 for a case 2 scenario, in accordance with an embodiment of the present invention.

Figure 6:
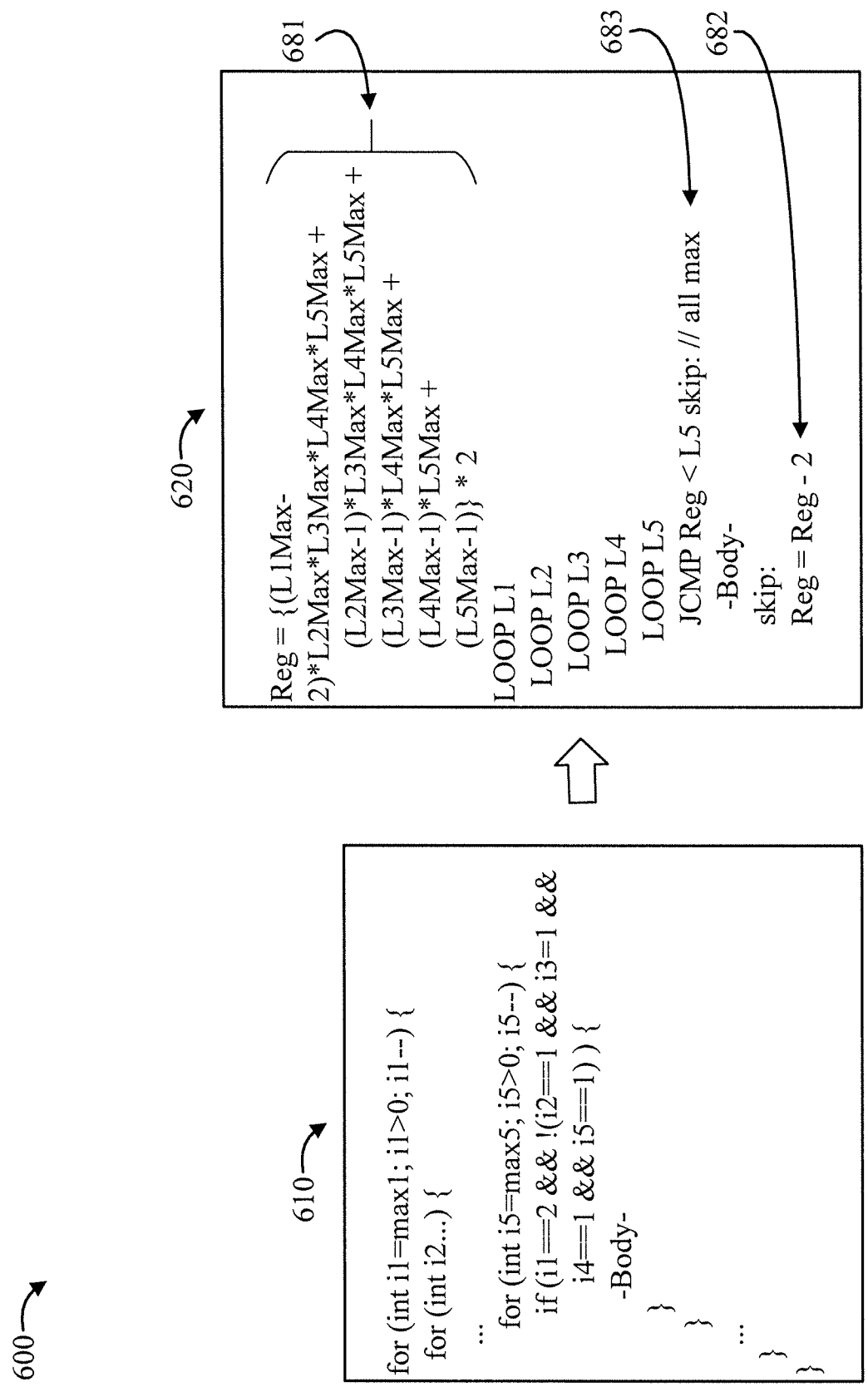
FIG. 6 is a diagram showing the software code and the device code corresponding to the case 2 scenario of FIG. 5, in accordance with an embodiment of the present invention.

FIG. 6 is a diagram showing the software code 610 and the device code 620 corresponding to the case 2 scenario of FIG. 5, in accordance with an embodiment of the present invention.

At block 505, determine if a conditional branch in the software code 610 is taken multiple times (e.g., loopCounter<10) at a range of continuous iterations during an execution of the software code 610. If so, then proceed to block 510. Otherwise, terminate the method.

At block 510, (i) add a register initialization instruction 681 outside of the loops, (ii) add a decrement instruction (−2) 682 for the register to the innermost loop of the loops, and (iii) replace the original conditional branch instructions 671 with one conditional branch 683 which compares a general register value with a value of a special register which holds the innermost loop counter value.

Figure 7:
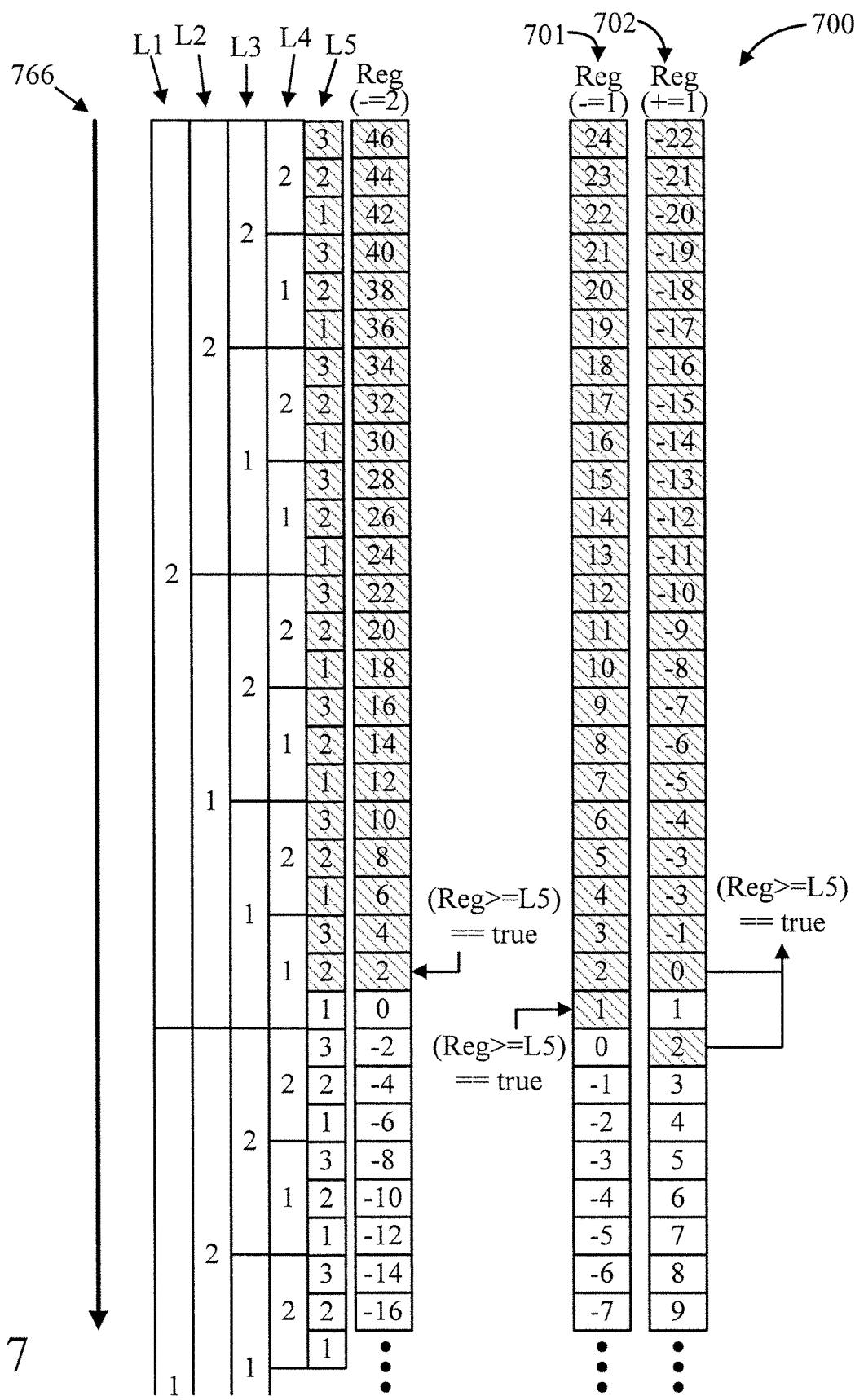
FIG. 7 is a block diagram showing an exemplary mapping of loop counter register numbers to loop counter values to register values side by side for comparison with exemplary register values, in accordance with an embodiment of the present invention.

FIG. 7 is a block diagram showing an exemplary mapping 700 of loop counter register numbers (L1 through L5) to loop counter values (N to 1, where N=3) to (general) register values (−16 through 46, in increments of 2) side by side for comparison with exemplary (general) register values 751 (for a −1 decrement) and 752 (for a +1 increment), in accordance with an embodiment of the present invention.

Referring to FIG. 7, the mapping 700 involves registers (storing 46 to −16 inclusive of 0, in increments of 2), 5 loops (L1 through L5), and 3 loop counter values (1, 2, and 3). The arrow 766 denotes the flow direction for loop iterations.

In the mapping, L1max=L2max=L3max= L4max= L5max=3. Hence, the loop counter value for the loop which is run N times will be decremented from N to 1. The loop iterations that have cross-hatching in loop L5 include conditions which should be detected.

Referring to FIG. 7, it can be seen by view of the cross-hatched portion of register columns 701 and 702 that an increment/decrement instruction by 1 cannot always detect conditions (right side examples).

A description will now be given regarding how to generate conditional branches in accordance with an embodiment of the present invention.

When an input program has conditional branch sentences, a compiler generates an "evaluation code" to find the loop iterations where the condition of the conditional branches becomes "true" ("true_values" in the following FIGS.)

A compiler evaluates the "evaluation code" and generates device code by the case 2 method if the loop iterations which full the conditions are continuous. Otherwise, device code is generated by the case 1 method.

When the loop iterations which fulfill the conditions are not continuous, a compiler uses this method recursively.

Figure 8:
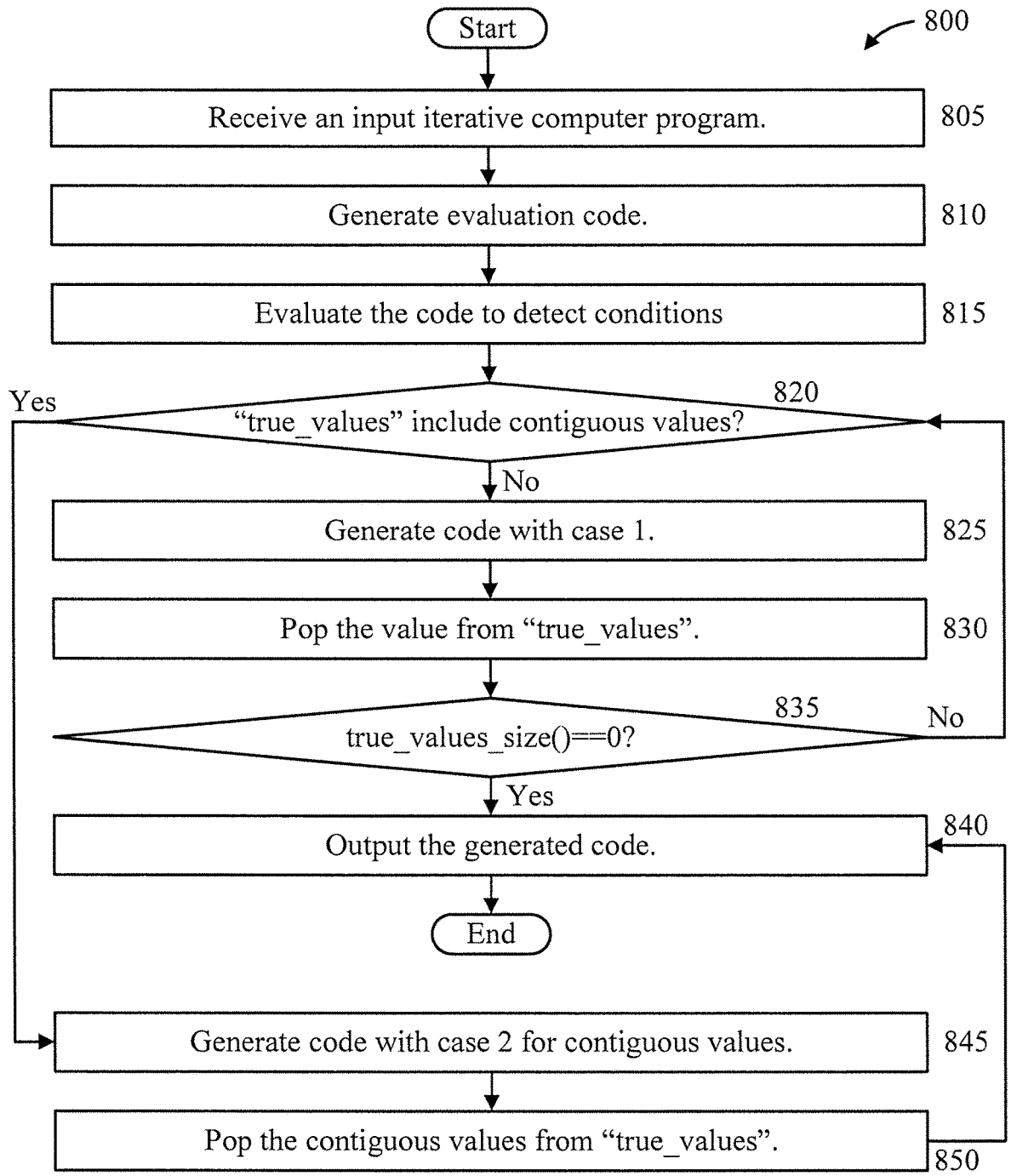
FIG. 8 is a flow diagram showing an exemplary method for generating conditional branches, in accordance with an embodiment of the present invention.

FIG. 8 is a flow diagram showing an exemplary method 800 for generating conditional branches, in accordance with an embodiment of the present invention.

At block 805, receive an input iterative computer program. FIG. 9 is a diagram showing an exemplary input program 900 to which the present invention can be applied, in accordance with an embodiment of the present invention.

Figure 10:
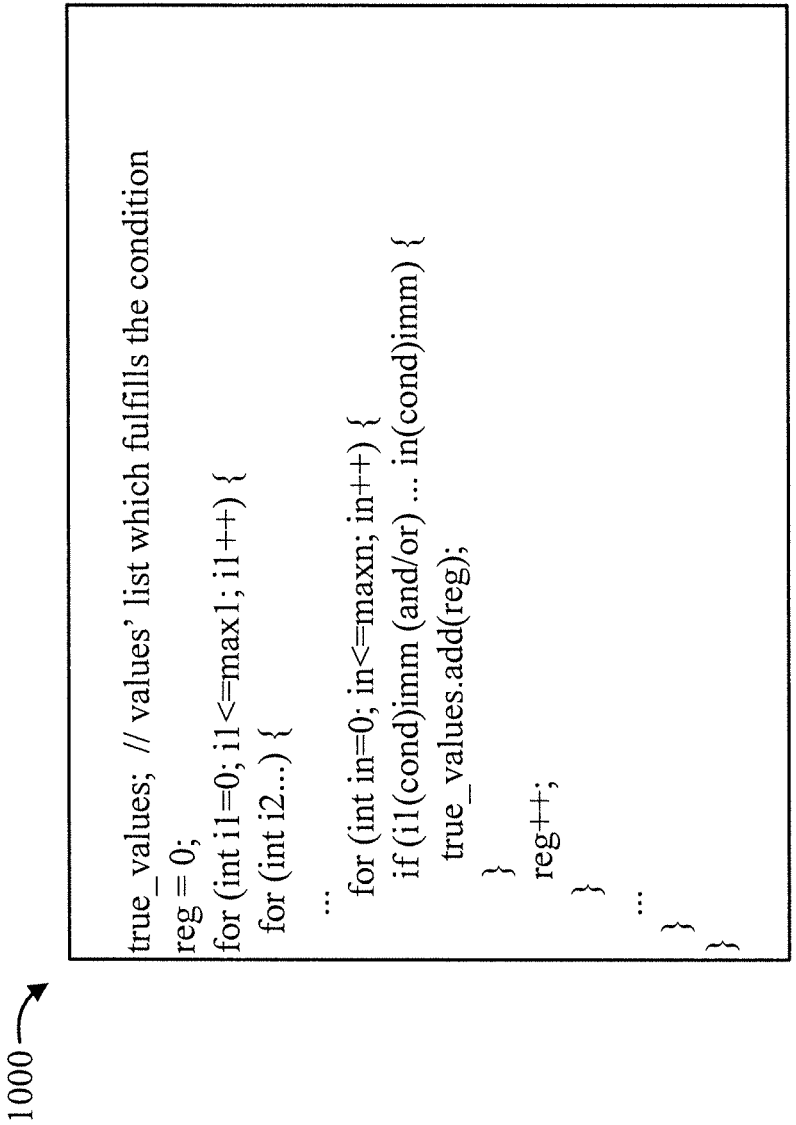
FIG. 10 is a diagram showing exemplary evaluation code, in accordance with an embodiment of the present invention.

At block 810, generate evaluation code. FIG. 10 is a diagram showing exemplary evaluation code 1000, in accordance with an embodiment of the present invention.

At block 815, evaluate the code to detect conditions (e.g., case 1 or case 2).

At block 820, determine whether the "true_values" include contiguous values. If so, then proceed to block 825. Otherwise, proceed to block 845.

Figure 11:
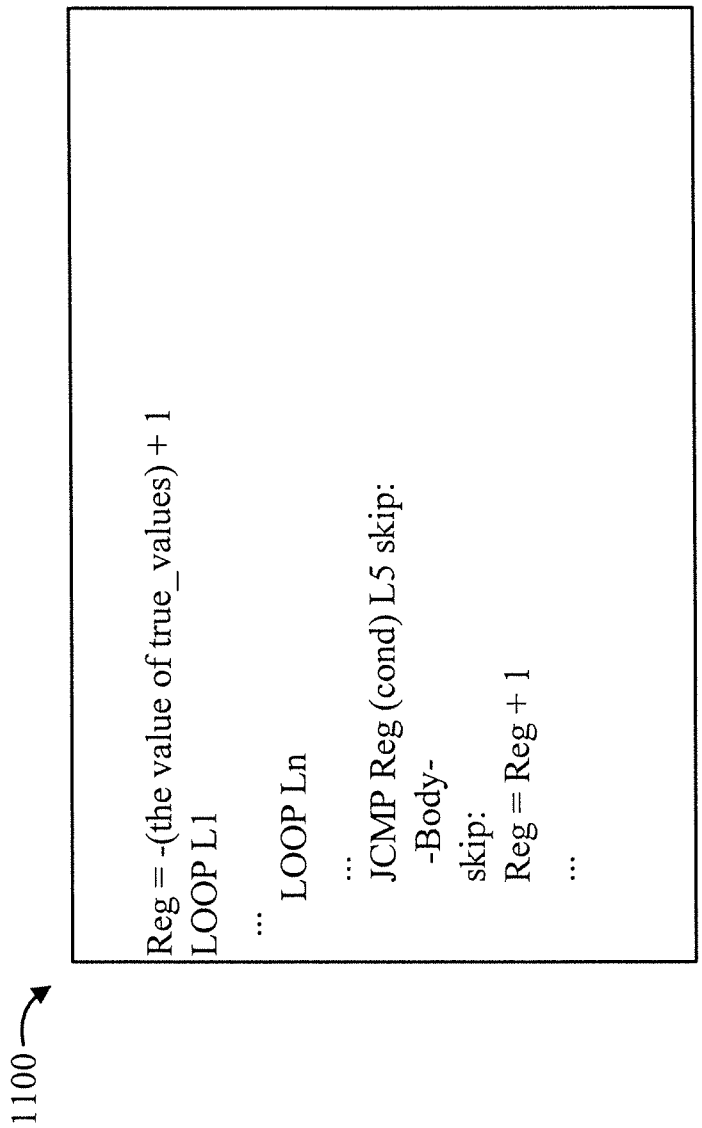
FIG. 11 is a diagram showing exemplary case 1 code, in accordance with an embodiment of the present invention.

At block 825, generate code with case 1. FIG. 11 is a diagram showing exemplary case 1 code 1100, in accordance with an embodiment of the present invention.

At block 830, pop the value from "true_values".

At block 835, determine whether true_values_size( )==0. If so, then proceed to block 840. Otherwise, return to block 820.

At block 840, output the generated code.

Figure 12:
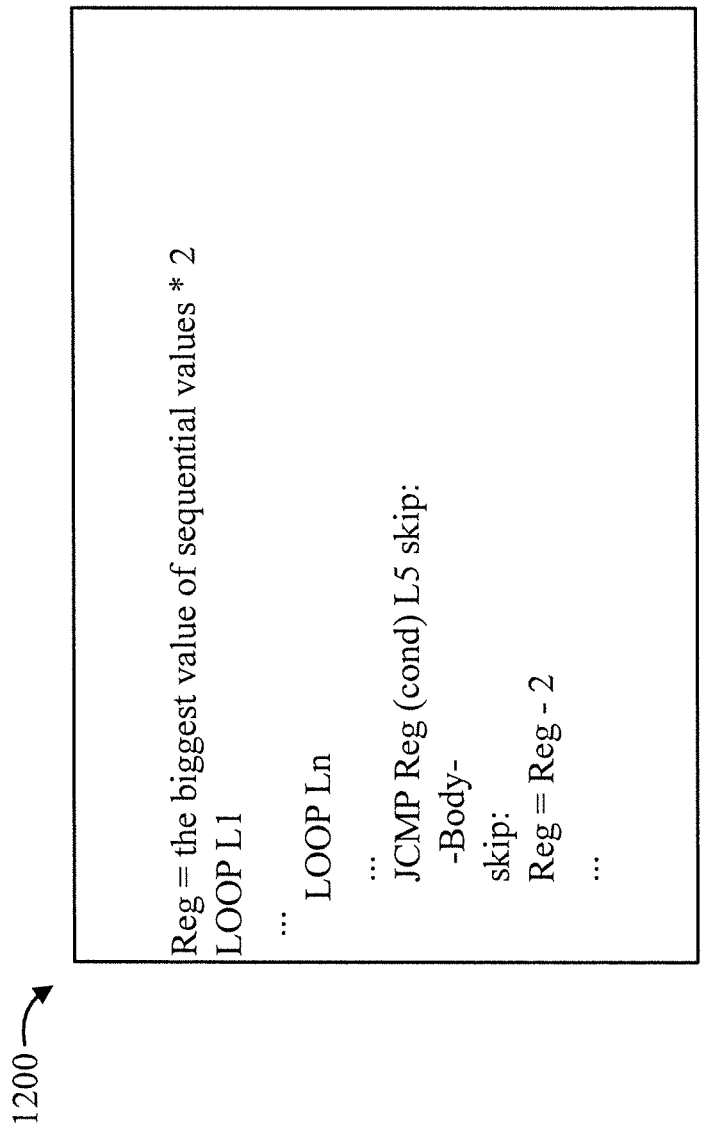
FIG. 12 is a diagram showing exemplary case 2 code, in accordance with an embodiment of the present invention.

At block 845, generate code with case 2 for contiguous values. FIG. 12 is a diagram showing exemplary case 2 code 1200, in accordance with an embodiment of the present invention.

At block 850, pop the contiguous values from "true_values".

Figure 13:
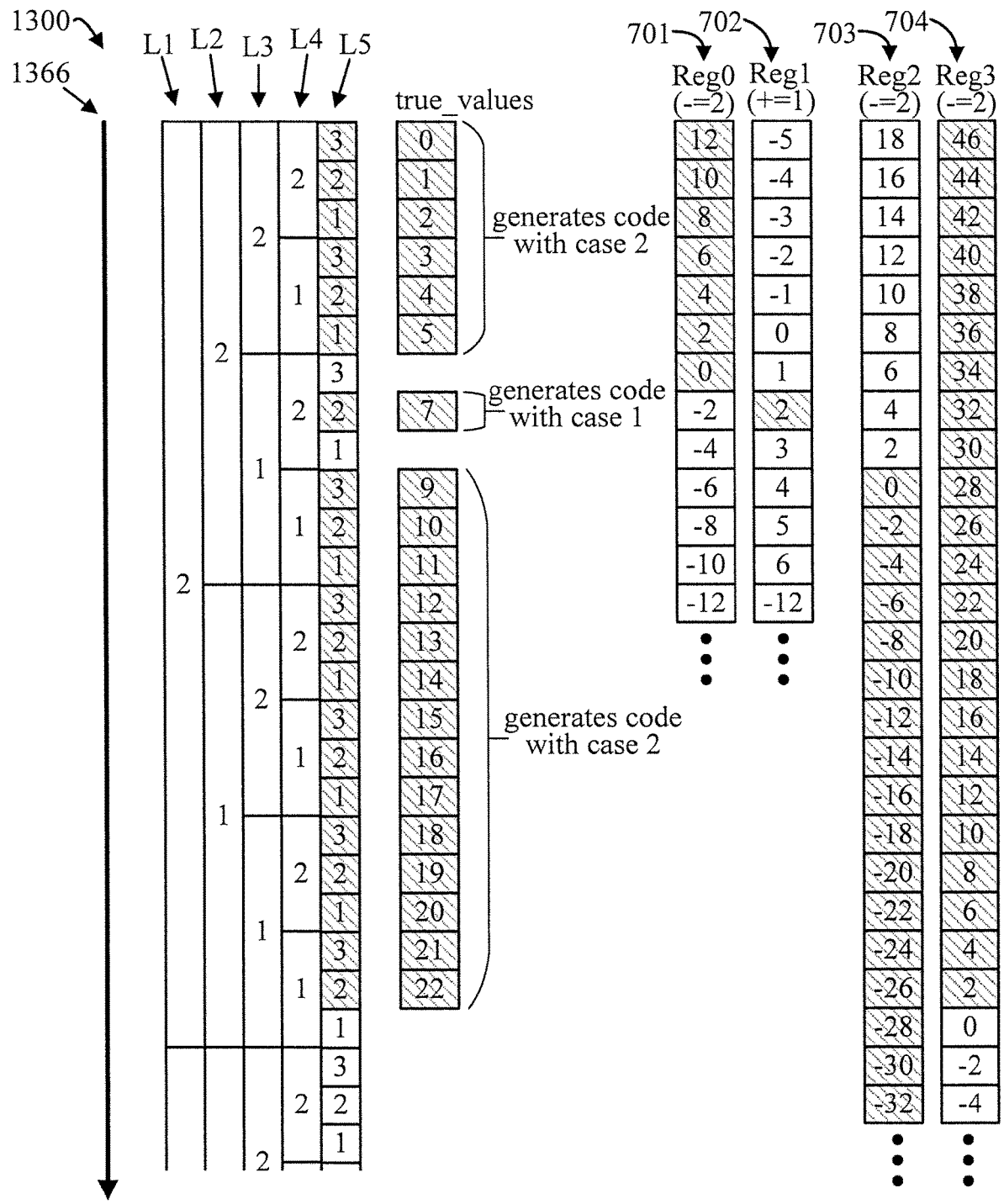
FIG. 13 is a diagram showing an exemplary use case that uses the case 1 method and the case 2 method recursively, in accordance with an embodiment of the present invention.

FIG. 13 is a diagram showing an exemplary use case 1300 that uses the case 1 method (e.g., FIGS. 2-3) and the case 2 method (e.g., FIGS. 4-5) recursively, in accordance with an embodiment of the present invention. FIG. 14 is a diagram showing generated code 1400 for the use case 1300 of FIG. 13, in accordance with an embodiment of the present invention.

In the example of FIG. 13, L1Max=L2Max=L3Max= L4Max=2, and L5Max=3. The arrow 1366 denotes the flow direction for loop iterations.

The loop counter value for the loop which runs N-times will be decremented from N to 1.

The loop iterations cross-hatched in L5 are conditions which should be detected as true. As shown in FIG. 12, the "true_values" stores the number of loop iteration on which the conditions which be detected as true.

By using the case 1 method and the case 2 method recursively, a compiler can generate device code for the conditions which is not continuous.

Reg0 701 is for the first continuous chunk of "true_values" (0-7) to use case 2 method.

Reg1 702 is for the second chunk of "true_values" (7) to use case 1 method.

Reg2 703 and Reg3 704 are for the third chunks of "true_values" (9-22) to use case 2 method.

Figure 15:
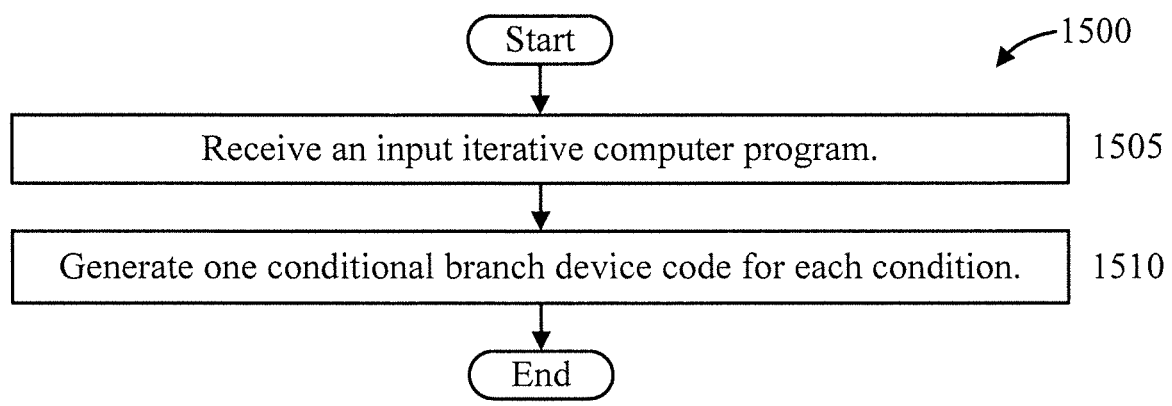
FIG. 15 is a diagram showing an exemplary naïve method, in accordance with an embodiment of the present invention.

FIG. 15 is a diagram showing an exemplary naïve method 1500, in accordance with an embodiment of the present invention.

At block 1505, receive an input iterative computer program. FIG. 16 is a diagram showing an exemplary input program 1600 to which the present invention can be applied, in accordance with an embodiment of the present invention.

Figure 17:
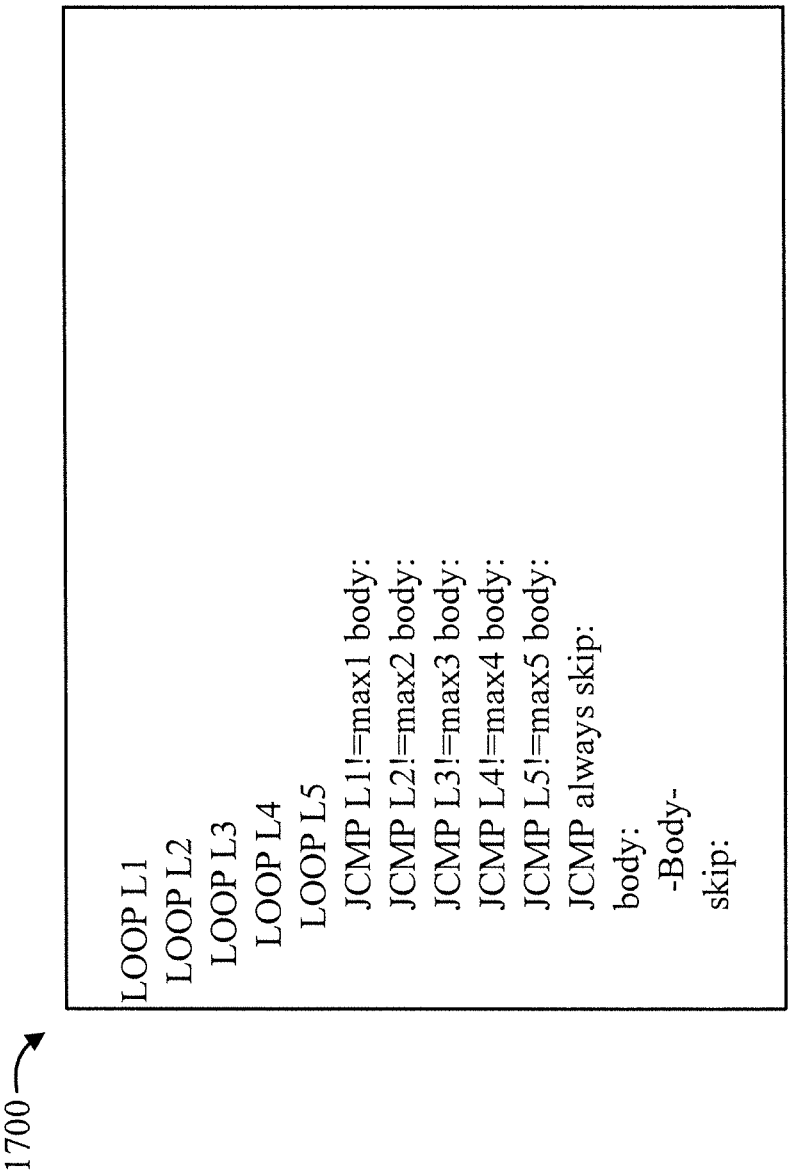
FIG. 17 is a diagram showing exemplary device code, in accordance with an embodiment of the present invention.

At block 1510, generate one conditional branch device code for each condition. FIG. 17 is a diagram showing exemplary device code 1700, in accordance with an embodiment of the present invention.

Figure 18:
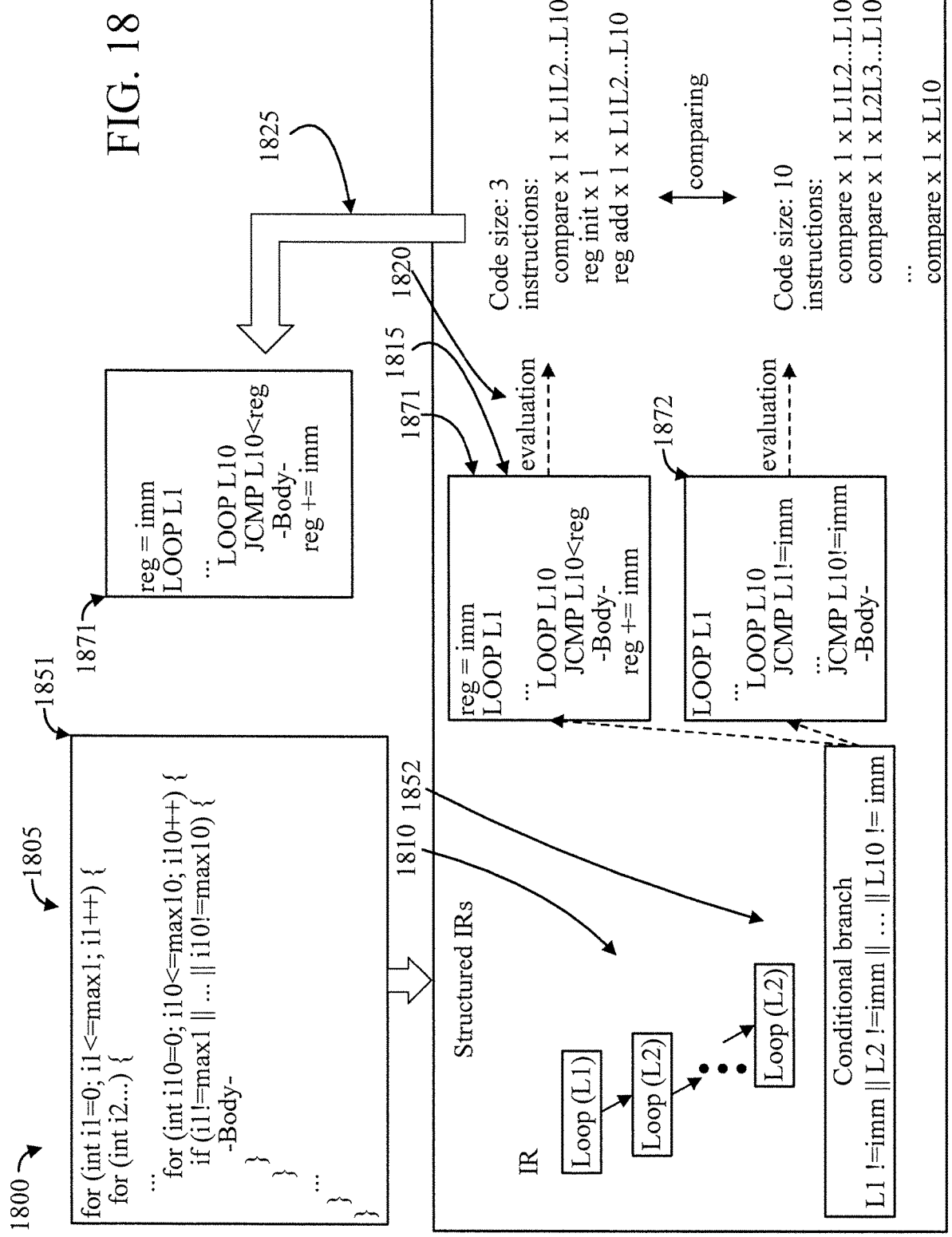
FIG. 18 is a high-level block diagram showing an exemplary compilation, in accordance with an embodiment of the present invention.

FIG. 18 is a high-level block diagram showing an exemplary compilation 1800, in accordance with an embodiment of the present invention.

At block 1805, receive an input iterative computer program 1851.

At block 1810, generate, by the compiler 1860, Intermediate Representation (IR) code 1852 based on the input iterative computer program.

At block 1815, generate, by the compiler 1860, device code 1871 for a conditional branch IR.

At block 1820, evaluate, by the compiler 1860, the device code 1871 and the naïve method 1872 based on the code size and the number of estimated instruction execution cycles.

At block 1825, select and output, by the computer 1860, the device code which has the highest score (from among the naïve method and the case 1 method and/or the case 2 method).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method performed during an execution of a compilation process for an iterative program having multiple nested loops, the method for automatically replacing a plurality of conditional branch instructions in the iterative program for a processor that is limited to only comparing a value of a general register with a value of a special register that holds a loop counter value, the method comprising:
    generating, in replacement of the plurality of conditional branch instructions, a conditional branch instruction that is limited to only comparing the value of the general register with the value of the special register that holds the loop counter value for an inner-most loop, responsive to the condition branch being taken one or more times;
    adding, by a processor-based compiler, (i) a register initialization instruction outside of the multiple nested loops and (ii) a register value adjustment to the inner-most loop; and
    defining, by the processor-based compiler, the value for the general register for the register initialization and conditions for the generated conditional branch instruction, responsive to one or more requirements of the plurality of conditional branch instructions.

2. The computer-implemented method of claim 1, wherein said adding step adds a register increment instruction as the register value adjustment, to the inner-most loop, to increment a value of the general register by one, responsive to the conditional branch being taken only once at a particular iteration during the execution of the compilation process.

3. The computer-implemented method of claim 1, wherein said adding step adds a register decrement instruction as the register value adjustment, to the inner-most loop, to decrement a value of the general register by two, responsive to the conditional branch being taken multiple times in a range of continuous iterations.

4. The computer-implemented method of claim 1, wherein the one or more requirements of the plurality of conditional branch instructions comprises an involved code size.

5. The computer-implemented method of claim 1, wherein the one or more requirements of the plurality of conditional branch instructions comprises a number of execution cycles.

6. The computer-implemented method of claim 1, further comprising:
    generating (i) a first device code comprising an increment by one instruction as the register value adjustment and (ii) a second device code comprising an decrement by two instruction as the register value adjustment; and
    selecting one of the first device code and the second device code, responsive to the one or more requirements of the plurality of conditional branch instructions.

7. The computer-implemented method of claim 6, wherein said selecting step compares the first device code and the second device code to a nave method that uses the plurality of conditional branch instructions.

8. The computer-implemented method of claim 1, further comprising generating evaluation code, the evaluation code configured to detect when conditions for the plurality of conditional branch instructions are true.

9. The computer-implemented method of claim 8, wherein the register adjustment value comprises a decrement by two instruction responsive to the conditions being true for a threshold number of continuous iterations.

10. The computer-implemented method of claim 8, wherein the register adjustment value comprises an increment by one instruction responsive to the conditions being true for less than a threshold number of continuous iterations.

11. A computer program product for a method performed during an execution of a compilation process for an iterative program having multiple nested loops, the method for automatically replacing a plurality of conditional branch instructions in the iterative program for a processor that is limited to only comparing a value of a general register with a value of a special register that holds a loop counter value, the computer program product comprising a non-transitory computer readable storage medium having program instructions embodied therewith, the program instructions executable by a computer to cause the computer to perform a method comprising:
    generating, by a processor-based compiler in replacement of the plurality of conditional branch instructions, a conditional branch instruction that is limited to only comparing the value of the general register with the value of the special register that holds the loop counter value for inner-most loop responsive to the condition branch being taken one or more times;
    adding, by the processor-based compiler, (i) a register initialization instruction outside of the multiple nested loops and (ii) a register value adjustment to the inner-most loop; and
    defining, by the processor-based compiler, the value for the general register for the register initialization and conditions for the generated conditional branch instruction, responsive to one or more requirements of the plurality of conditional branch instructions.

12. The computer program product of claim 11, wherein said adding step adds a register increment instruction as the register value adjustment, to the inner-most loop, to increment a value of the general register by one, responsive to the conditional branch being taken only once at a particular iteration during the execution of the compilation process.

13. The computer program product of claim 11, wherein said adding step adds a register decrement instruction as the register value adjustment, to the inner-most loop, to decrement a value of the general register by two, responsive to the conditional branch being taken multiple times in a range of continuous iterations.

14. The computer program product of claim 11, wherein the one or more requirements of the plurality of conditional branch instructions comprises an involved code size.

15. The computer program product of claim 11, wherein the one or more requirements of the plurality of conditional branch instructions comprises a number of execution cycles.

16. The computer program product of claim 11, further comprising:
   generating (i) a first device code comprising an increment by one instruction as the register value adjustment and (ii) a second device code comprising an decrement by two instruction as the register value adjustment; and
   selecting one of the first device code and the second device code, responsive to the one or more requirements of the plurality of conditional branch instructions.

17. The computer program product of claim 16, wherein said selecting step compares the first device code and the second device code to a nave method that uses the plurality of conditional branch instructions.

18. The computer program product of claim 11, further comprising generating evaluation code, the evaluation code configured to detect when conditions for the plurality of conditional branch instructions are true.

19. The computer program product of claim 18, wherein the register adjustment value comprises a decrement by two instruction responsive to the conditions being true for a threshold number of continuous iterations.

20. A computer processing system for performing a method during an execution of a compilation process for an iterative program having multiple nested loops, the method for automatically replacing a plurality of conditional branch instructions in the iterative program for a processor that is limited to only comparing a value of a general register with a value of a special register that holds a loop counter value, the system comprising:
   a memory for storing program code; and
   a processor-based compiler for running the program code to
      generate, in replacement of the plurality of conditional branch instructions, a conditional branch instruction that is limited to only comparing the value of the general register with the value of the special register that holds the loop counter value for n inner-most loop responsive to the condition branch being taken one or more times;
      add (i) a register initialization instruction outside of the multiple nested loops and (ii) a register value adjustment to the inner-most loop; and
      define the value for the general register for the register initialization and conditions for the generated conditional branch instruction, responsive to one or more requirements of the plurality of conditional branch instructions.

* * * * *